US008348251B2

(12) United States Patent
Gallo

(10) Patent No.: US 8,348,251 B2
(45) Date of Patent: Jan. 8, 2013

(54) SEWING CLIP

(75) Inventor: Paul Edward Gallo, San Francisco, CA (US)

(73) Assignee: Paul Edward Gallo, San Francisco, CA (US)

( * ) Notice: Subject to any disclaimer, the term of this patent is extended or adjusted under 35 U.S.C. 154(b) by 725 days.

(21) Appl. No.: 12/540,284

(22) Filed: Aug. 12, 2009

(65) Prior Publication Data

US 2010/0038838 A1 Feb. 18, 2010

Related U.S. Application Data

(60) Provisional application No. 61/188,862, filed on Aug. 14, 2008.

(51) Int. Cl.

| | |
|---|---|
| ***B25B 1/00*** | (2006.01) |
| ***B25B 1/02*** | (2006.01) |
| ***B25B 1/10*** | (2006.01) |
| ***B25B 27/14*** | (2006.01) |
| ***B25B 27/00*** | (2006.01) |
| ***B23Q 3/02*** | (2006.01) |
| ***B23P 19/04*** | (2006.01) |
| ***A41F 1/00*** | (2006.01) |

(52) U.S. Cl. .................. 269/3; 269/6; 269/95; 269/143; 269/249; 29/257; 29/278; 29/270; 24/507; 24/509; 24/510

(58) Field of Classification Search .................. 269/3, 6, 269/95, 143, 249; 29/257, 278, 270; 24/507, 24/509, 499, 500, 501, 502, 67.7
See application file for complete search history.

(56) References Cited

U.S. PATENT DOCUMENTS

| | | | | |
|---|---|---|---|---|
| 4,063,333 | A * | 12/1977 | Schweitzer | 24/567 |
| 4,175,306 | A * | 11/1979 | Bigelow et al. | 24/507 |
| 6,598,268 | B1 * | 7/2003 | Zelman | 24/3.3 |
| 6,754,937 | B1 * | 6/2004 | Martin | 24/351 |
| 7,434,711 | B1 * | 10/2008 | Sutton | 223/96 |
| 8,201,310 | B1 * | 6/2012 | Abdi et al. | 24/507 |

* cited by examiner

*Primary Examiner* — Monica Carter
*Assistant Examiner* — Nirvana Deonauth
(74) *Attorney, Agent, or Firm* — Perkins Coie LLP

(57) ABSTRACT

A sewing clip is provided. In one embodiment, the sewing clip securely clamps fabrics of various thicknesses, sizes, elasticity, and textures in assistance of a sewing operation. The sewing clip includes two rigid members and an elastic assembly. The two rigid members each have a first surface with a clamping and handling end and a hinge extension coupled to the first surface. When employed in a sewing operation, the clamping end of each rigid member has a tapering-width adapted to slide in a direction away from a stitching point. An elastic assembly couples the hinge extensions of each rigid member and biases the two rigid members so as to secure overlapping fabric between the clamping ends while avoiding unnecessary alteration or damage to the fabric. A recessed divot is also provided in the clamping end that allows for retention of surplus fabric.

15 Claims, 8 Drawing Sheets

SEWING CLIP

CROSS-REFERENCE TO RELATED APPLICATION

This application claims priority to preceding U.S. Provisional Patent Application No. 61/188,862, entitled “GETTA GRIP SEWING CLIP” and filed on Aug. 14, 2008.

BACKGROUND

The present disclosure relates generally to an apparatus for textiles and more particularly to an apparatus for a sewing operation.

During the process of sewing, small pieces of metal wire having at least one pointed end, such as straight pins, safety pins, and T-pins, are widely used and have been around for many years. These pins, generally known as sewing pins, are used to join or affix layers of fabric. For example, layers of material in temporarily held in place prior to and during stitching for the purpose of simulating where a line of stitching or a seam would be on an article of clothing.

The typical sewing pin is secured in place by alternately piercing the material and weaving above and below the layer(s) of fabric. As such, the pins cause unsightly pinholes in the material(s) and may also destroy the structural elasticity and integrity of some textiles. Additionally, if the sewing pin does not cleanly slide through the fabric, the pin can snag the threads of delicate materials.

Another disadvantage is that sewing pins lack durability and can easily break if handled with excess force. In a typical sewing operation, sewing pins hold the layer(s) of fabric in place up until right before a needle more permanently stitch the layer(s) of fabric. Due to the proximity of the sewing needle to sewing pins, sewing needles frequently come in contact with pins during a sewing operation. More specifically, a sewing machine (an appliance that automates the motion of a needle or needles to bind fabric with a stitch) can easily snap or bend a sewing pin if the machine’s needle strikes the sewing pin. Likewise, sewing pins can disrupt the function of a sewing machine by breaking, dulling, or misaligning the sewing machine’s needle(s). This contact during a sewing operation often damages the sewing needle, calling for frequent (and expensive) replacement.

The sewing pin’s slight dimensions render a further disadvantage when lost or misplaced. In addition, a further disadvantage is the possibility of sustaining an injury from the sharp pointed end, wherein the piercing-end punctures the skin and causes blood to stain fabric. Furthermore, metal sewing pins are susceptible to rust and corrosion, causing problems for the user and the fabric. Moreover, the process of pinning in place, removing, and then safely stowing away entails additional time and care to prevent injury, loss, and breakage.

Another drawback to sewing pins is that the thin metal wire cannot completely penetrate or weave through excessively thick or bulky textiles such as leather hide or fur. In lieu of sewing pins, glues such as rubber cement and vinyl acetate, have commonly been employed to temporarily affix these textiles together. However, it has been found that these glues can clog sewing machine needles, break the thread, and cause skipped stitches. Moreover, these glues emit a toxic odor and are harmful to all whom are exposed to the fumes.

SUMMARY

The present invention is described and illustrated in conjunction with systems, apparatuses, and methods of varying scope. In addition to the aspects of the present invention described in this summary, further aspects of the invention will become apparent by reference to the drawings and by reading the detailed description that follows.

The multipurpose sewing clip facilitates all the different aspects and operations that sewing comprises including, but not limited to, fitting, adjusting, draping, hemming, display, and stitching. As described in greater detail below, in accordance with certain embodiments, the sewing clip securely clamps fabrics of various thicknesses, sizes, elasticity, and textures in assistance with a sewing operation.

The sewing clip overcomes many of the disadvantages associated with the sewing pin. There is no need for the sewing clip to pierce through fabric, subsequently causing unsightly pinholes. Additionally, by not having to pierce through fabric, the sewing clip minimizes the risk of snagging a thread and destroying the elasticity and structural integrity of textiles. The lack of a sharp pointed-end lessens the chance of a skin puncture and possible blood-stains. The functionality of the sewing clip allows for ease of use and avoids the time-consuming process of pinning in place, removing, and then stowing the sharp pointed-end away.

The scale of the sewing clip allows for users to easily see, hold, and handle the implement as well as allowing for greater resilience to breakage and loss. In addition, the clip’s structure lessens the risk of a sewing machine needle coming in contact with the sewing clip. Moreover, the sewing clip accommodates many types of textiles including excessively thick or bulky materials such as leather and fur. As such, the sewing clip does not call for the use of toxic glues and subsequent problems with skipped stitches.

In one embodiment, an apparatus for sewing is provided. The sewing clip includes two rigid members and an elastic assembly. The two rigid members each have a first surface with a clamping end, a handling end, and a hinge extension coupled to the first surface. When employed in a sewing operation, the clamping end of each rigid member has a tapering-width adapted to slide in a direction away from a stitching point. An elastic assembly couples the hinge extensions of each rigid member and biases the two rigid members so as to secure overlapping fabric between the clamping ends while avoiding unnecessary alteration or damage to the fabric. A recessed divot in the clamping end is also provided that allows for retention of surplus fabric.

Embodiments of the invention presented are examples and illustrative in nature, rather than restrictive.

BRIEF DESCRIPTION OF THE DRAWINGS

Embodiments of the invention are illustrated in the figures. However, the embodiments and figures are illustrative rather than limiting, provide examples of the invention.

DETAILED DESCRIPTION

In various embodiments, a sewing clip for securely clamping fabrics of various thicknesses, sizes, elasticity, and textures is provided. In the following description, for purposes of explanation, numerous specific details set forth in order to provide a thorough understanding of the invention. It will be apparent, however, to one skilled in the art that the invention can be practiced without these specific details. In other instances, structures, and devices are shown in block diagram form in order to avoid obscuring the invention.

Reference in the specification to "an example," "one embodiment," or "an embodiment" means that a particular feature, structure, or characteristic described in connection with the embodiment is included in at least one embodiment of the invention. The appearance of the phrases "in one embodiment" in various places in the specification are not necessarily all referring to the same, nor are separate or alternative embodiments mutually exclusive of other embodiments.

In various embodiments, the techniques introduced here enable home sewers, fashion students, garment manufacturers, and anyone who needs to join, affix, bind, hold, or retain textiles a multipurpose clip that facilitates all the different aspects and operations that sewing comprises including, but not limited to, fitting, adjusting, draping, hemming, display, embroidering, suturing, and stitching.

Figure 1:
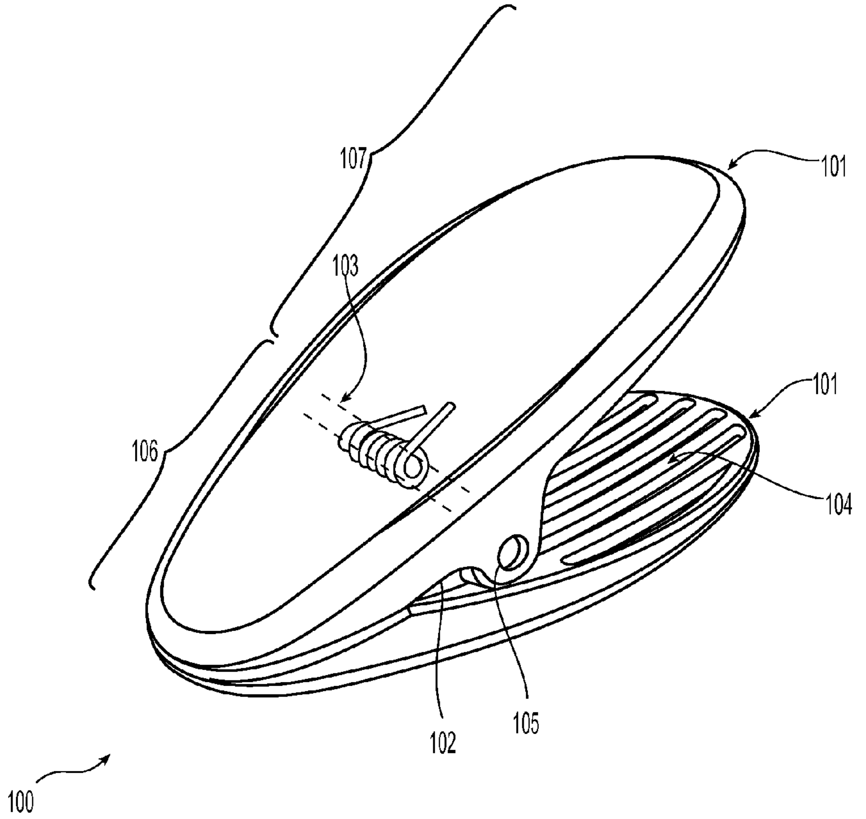
FIG. 1 is an enlarged perspective view illustrating the pivoting elongate members in a fully-closed position.

FIG. 1 generally shows a sewing clip, generally depicted by reference numeral 100. As shown in FIG. 1, the apparatus includes two substantially rigid members 101, a recessed divot 102, and an elastic assembly 103.

Figure 2:
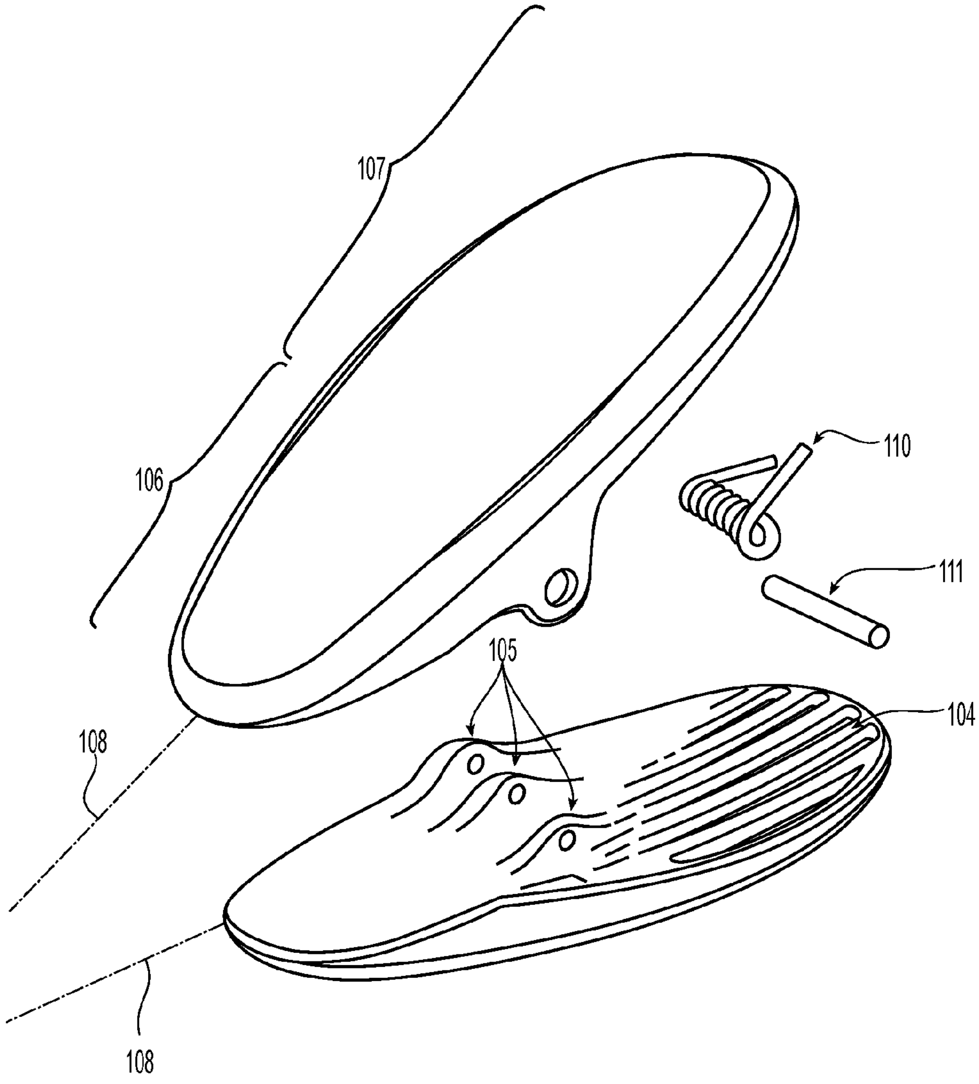
FIG. 2 is an exploded perspective view illustrating the pivoting elongate members.

FIG. 1 also illustrates that each rigid member 101 includes a first surface 104 and a hinge extension 105. Each rigid member 101 has at least one first surface 104, but can have a plurality of surfaces. The first surface 104 is a planar or curved outermost boundary of a three-dimensional region. As an example, FIG. 2 illustrates an embodiment of a first surface 104 with a planar outermost boundary having a generally elliptical shape. The hinge extension 102 is a joint that allows two components to be coupled together so that one can swing relative to the other. FIG. 1 illustrates an example of a hinge extension 105 as a protruding tab having an aperture for receiving a pin. The first surface 104 in the embodiment in FIG. 1 has three hinge extensions. However, it will be apparent to one skilled in the art that the first surface 104 requires at least one hinge extension 105.

This first surface 104, in further detail in FIG. 2, has a clamping end 106 and a handling end 107. The clamping end 106 is the portion of a rigid member 101 that extends from the hinge extension 105 to the furthest point where materials are held or secured together. The handling end 107 is the portion of a rigid member 101 that extends from just above the hinge extension 105 to the farthest point where the apparatus is held when used or moved. The clamping end 106 and the handling end 107 may encompass, but is not limited to, the first surface 104 and can include multiple surfaces. The first surface 104 also includes an axis 108 which extends from the clamping end 106 to the handling end 107.

In addition, the width (or a horizontal measurement taken at a right angle to the axis 108) of the clamping end 106 tapers such that the width of the clamping end gradually becomes narrower. FIG. 2 shows an embodiment of a clamping end 106 having a tapering width with a parabolic-like shape. However, it will be apparent to one skilled in the art that other embodiments of a tapering width are conceivable.

Figure 3:
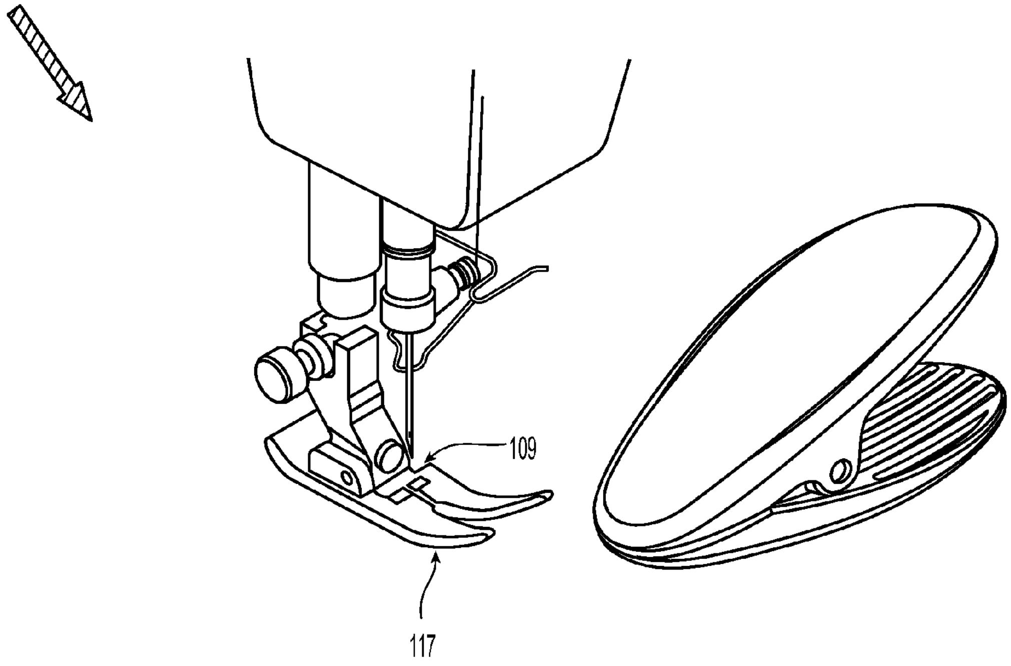
FIG. 3 is an enlarged perspective view illustrating an example of the sewing clip as used in a sewing operation.

Moreover, the tapering width is adapted to slide the clamping end 106 in a direction away from a stitching point 109. For the embodiment shown in FIGS. 1 and 2, FIG. 3 illustrates an example of the sewing clip's 100 movement in conjunction with a sewing machine. As the sewing clip 100 approaches the needle during a typical stitching operation, the force of the moving fabric compels a presser foot 117 of a sewing machine to press on the clamping end's 106 tapered-profile. This in turn slides the clamping end 106 in a direction away from the stitching point 109. The shape of the clip, the position of the clip 100 as it is affixed to the fabric, the grade of the tapering, and the type of machine (e.g., stitching, embroidery, surging, etc.) dictate the corresponding arc and direction in which the clamping end 106 slides.

The substantially rigid members 101 and hinge extensions 105 may be constructed from a variety of materials including, but not limited to, wood, plastic, metal, and composites. The substantially rigid members 101 can be manufactured of any sturdy, relatively inflexible material such that a hinge extension 105 can act as a fulcrum about which the clamping ends 106 and handling ends 107 can pivot about the hinge extension 105. The elastic assembly 103, described below, may be constructed from any metallic, plastic, rubber element or compound.

Figure 4:
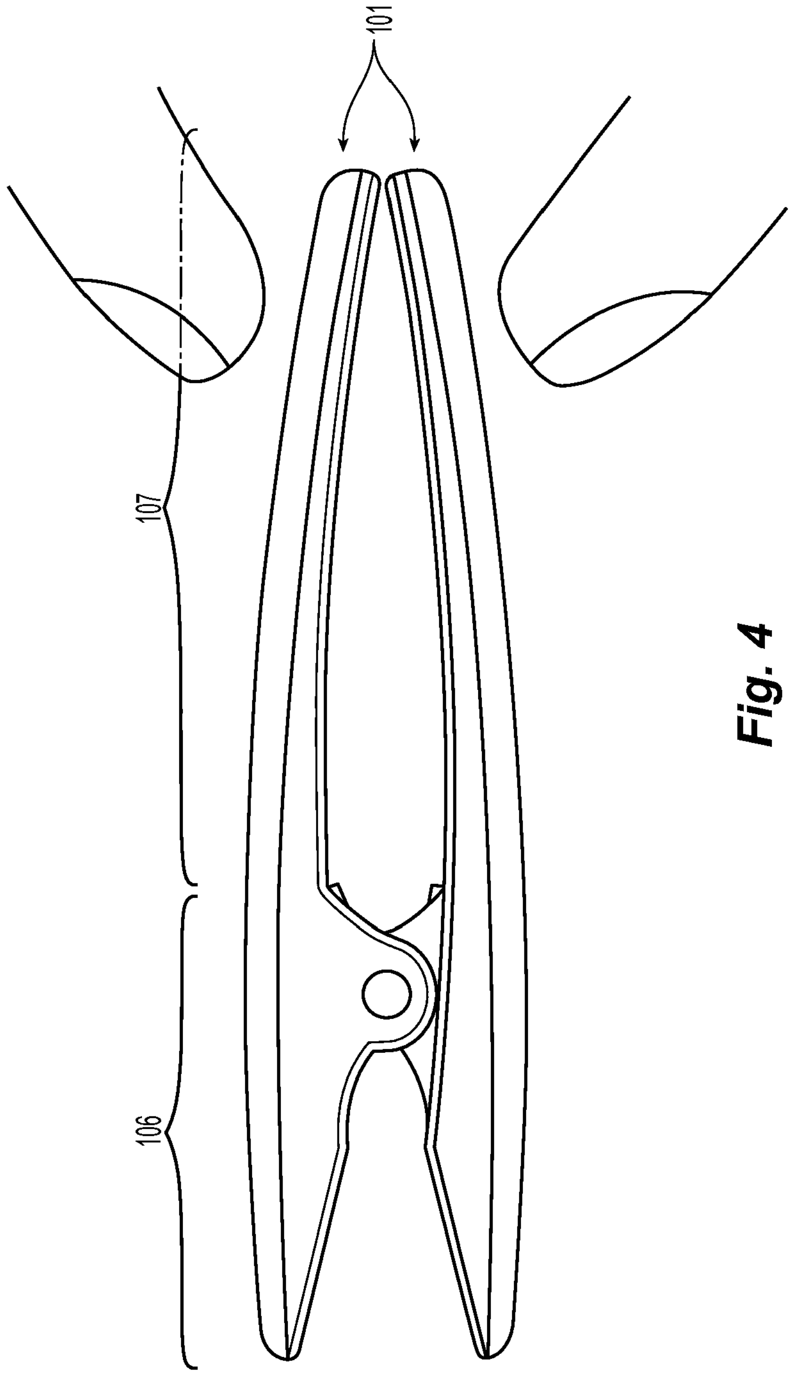
FIG. 4 is an enlarged side view illustrating the pivoting elongate members in a fully-open position.
Figure 5:
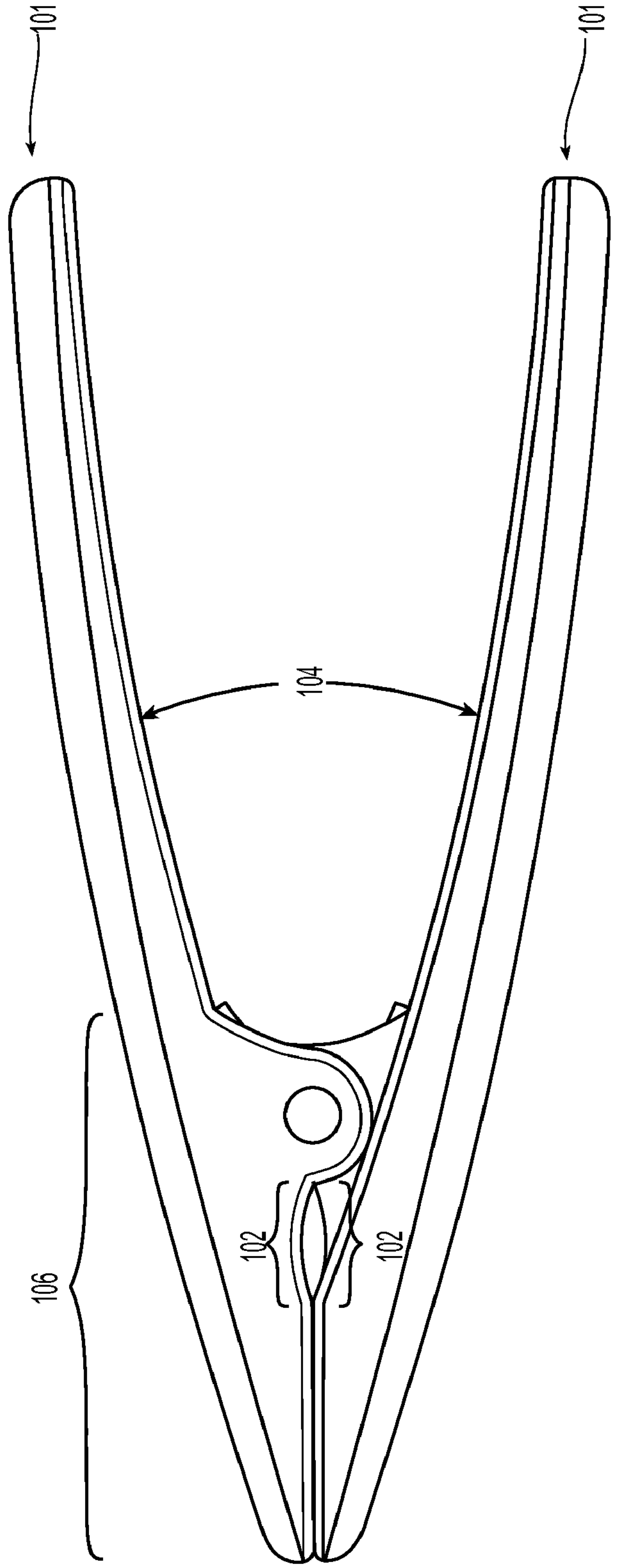
FIG. 5 is an enlarged side view illustrating the pivoting elongate members in a fully-closed position.

As shown in FIGS. 4 and 5, the sewing clip may be compelled or biased into an open position by applying pressure to the handling ends 107. FIG. 4 illustrates a profile view of an embodiment of the invention in which two substantially rigid members 101 are biased in a fully-open position whereby the span between the furthest points of the clamping ends 106 is maximized to its fullest. FIG. 4 shows a fully-open position as one in which the furthest points of the handling ends 107 are in contact. However, it will be apparent to one skilled in the art that a fully-open position can also as be defined in other ways. In the same manner, FIG. 5 illustrates a profile view of an embodiment of the invention in which two substantially rigid members 101 are biased in a fully-closed position.

FIG. 5 also shows a recessed divot 102 on an embodiment of the invention. A recessed divot 102 is an indentation on a first surface 104 of a rigid member 101 that creates a cavity in which surplus fabric can be held in the clamping end 106. Surplus fabric can be defined as, among other things, the addition of a new textile to the fabric already-held in the clamping end 106 or drawing-in more of the already-held fabric into the clamping end 106. At a minimum, embodiments of the invention have at least one recessed divot 102 on at least one of the first surfaces 104 of the sewing clip 100. However it will be apparent to one skilled in the art that there can be more than one first surface 104 having a recessed divot 102 as well as more than one recessed divot 102 on one first surface 104. FIG. 5 illustrates the former embodiment in which each first surface 104 of each substantially rigid member 101 contains one recessed divot 102 wherein the indentation is an arcuate cavity.

Figure 6:
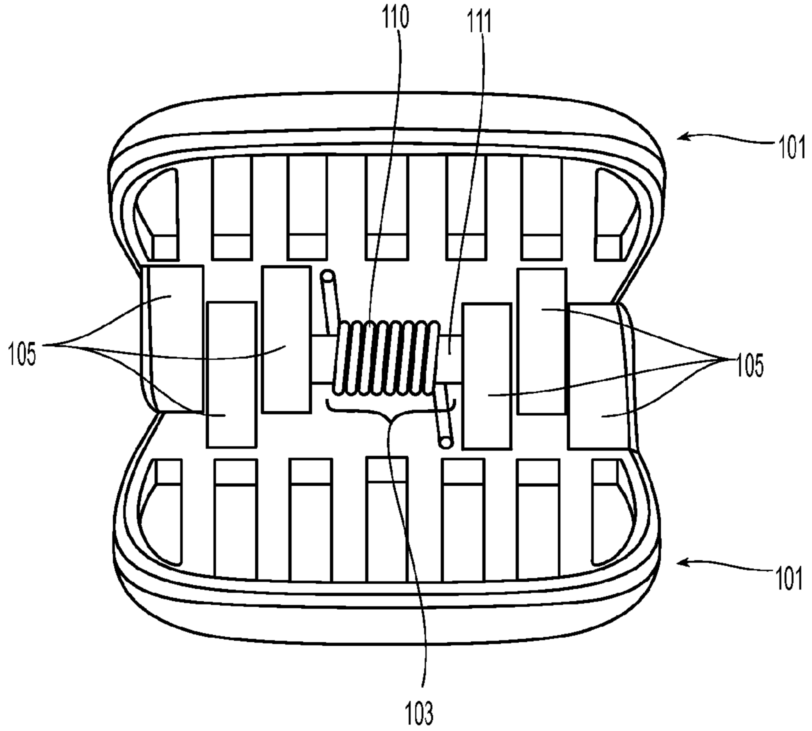
FIG. 6 is an enlarged top plan view illustrating the pivoting elongate members in a closed position.
Figure 7:
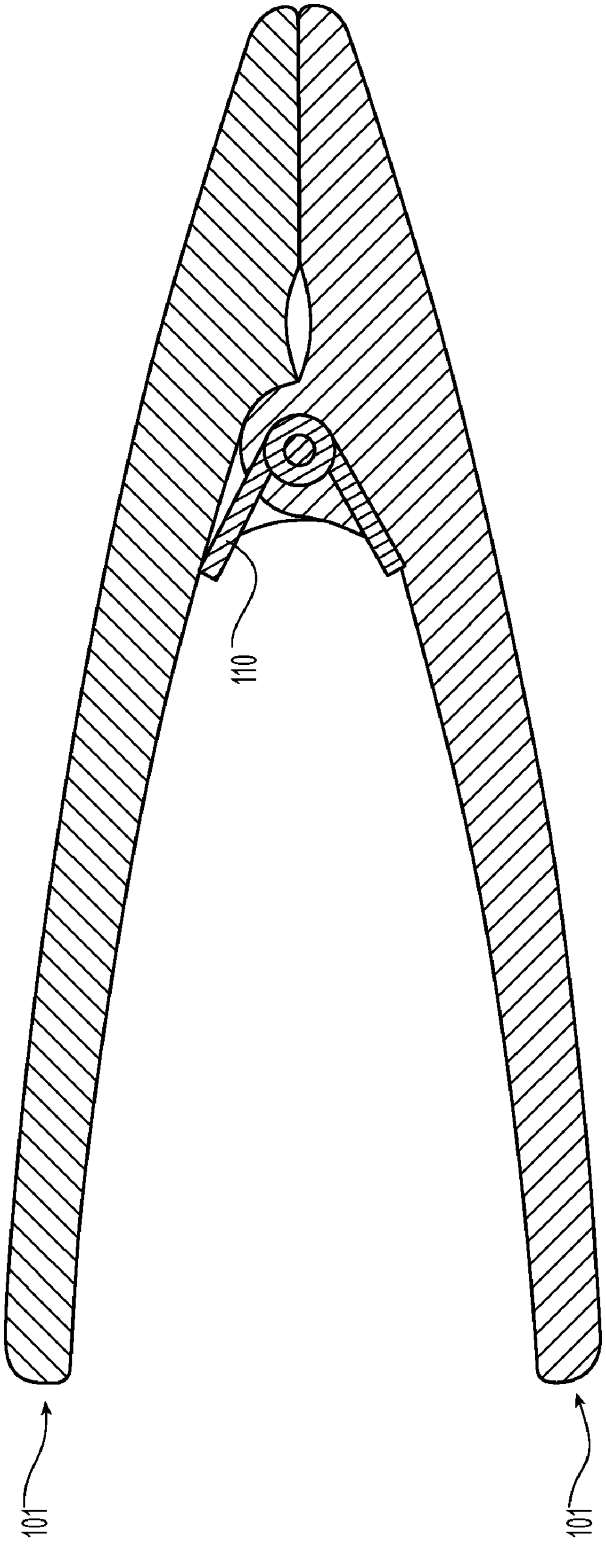
FIG. 7 illustrates a cross-section of a side view illustrating the pivoting elongate members in fully-closed position.

FIG. 6 illustrates an example of an elastic assembly 103 in an embodiment of the invention. An elastic assembly 103 couples the hinge extensions 105 of the two substantially rigid members 101. The elastic assembly 103 also biases the two rigid members 101 so as to secure layer(s) of overlapping fabric between the clamping ends 106. Embodiments of the elastic assembly 103 can be a helical torsion spring and pin member, a hinge spring, a cantilever spring or other similar structures. However, it will be apparent to one skilled in the art that the elastic assembly 103 can be a combination of components or a single component. The elastic assembly 103 shown in FIG. 6 includes a pin member 111 that couples the hinge extensions 105 of each rigid member 101 and a helical torsion spring 110 with annular coils mounted around the pin member 111 to bias the rigid members 101 in a fully-closed position that secures fabric. FIG. 2 also illustrates this embodiment of the elastic assembly with a helical torsion spring 110 and pin member 111. A cross-sectional view of the helical torsion spring 110 is shown in FIG. 7 where the rigid members 101 apply sideway forces to the ends of the helical torsion spring to twist the coil tighter.

In addition to the elastic assembly 103, FIG. 6 also illustrates an example of the arrangement of hinge extensions 105 in an embodiment of the invention. As shown in FIG. 6, the hinge extensions 105 from a first rigid member 101 interweaves with the hinge extensions 105 from a second rigid member 101. For this type of interwoven arrangement, the location of hinge extensions 105 on this embodiment can be seen in FIG. 2 on a singular rigid member 101. FIG. 2 illustrates an asymmetrical layout of the hinge extensions 105 on a singular rigid member 101 wherein the hinge extensions' 105 locations are not evenly positioned about a longitudinal axis 108 of a rigid member 101. Although the rigid members 108 are not symmetrical, the first and second rigid members can still be coupled together. Moreover, the rigid members 108 can still be identical pieces for ease in manufacturing and assembly. Hinge extensions 105 with other arrangements and layouts different from this embodiment are also possible and apparent to a person skilled in the art.

The clamping end 106 of a substantially rigid member 101 accommodates a variety of materials with differing thicknesses, sizes, elasticity, and textures. As such, the clamping end's 106 first surface 104 may vary in design parameters in order to most suitably secure material between the clip or to prevent extensive movement or separation through the application of inward pressure. These design parameters include, but are not limited to: size, shape, surface area, texture. For example, in one embodiment of the invention, the first surface 104 of the clamping end 106 may be covered with velvet or a rubber coating to prevent thin fabrics from slipping. In another embodiment of the invention, the first surface 104 of the clamping end 106 is similar to the surface of a hairbrush so as to immobilize fur materials. In another embodiment of the invention, the surface area of the clamping area 106 is corrugated to better grip a fabric. Lastly, the handling end 107 of the sewing clip can also be ergonomically designed to allow the user to more handily open and close the apparatus 100.

Figure 8:
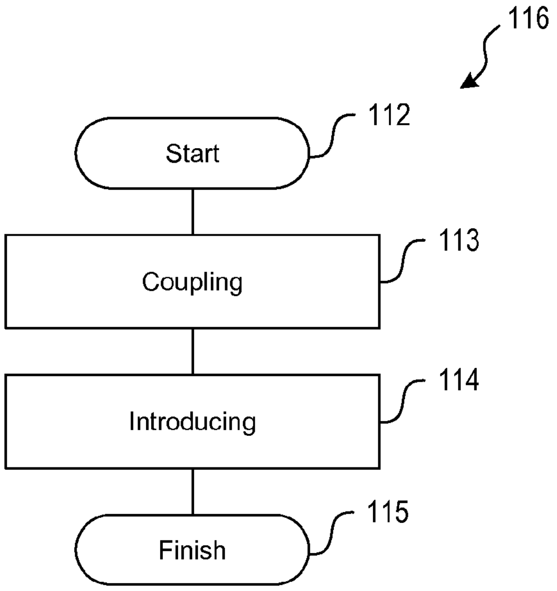
FIG. 8 illustrates a method of assembling a sewing clip.

FIG. 8 illustrates a method 116 of assembling the sewing clip. From start 112 the method 116 comprises the coupling 113 of the two substantially rigid members 101 with an elastic assembly 103 and introducing 114 the elastic assembly 103 to the sewing clip 100 that couples the hinge extension(s) 105 of each rigid member 101 and that biases the rigid members 101 to secure fabric in the clamping ends 106. In the coupling step 113 of the method 116, the rigid members 101 each have a first surface 104, hinge extension 105, and a recessed divot 102 as described above. The steps of the method 116 do not necessarily occur in the order as written above, but can occur in any order. The method 116 finishes 115 upon completion of the coupling 113 and introducing step 114.

What is claimed:

1. An apparatus for a sewing operation comprising:

a first substantially rigid, elongate member with an oval surface having:

a first handling end having a contoured surface;

a first clamping end having a tapering width and a length shorter than a length of the first handling end, the first clamping end adapted to slide in a direction away from a stitching point; a first hinge extension located between the first clamping end and the first handling end such that the first hinge extension is a fulcrum about which the first clamping end and the first handling end can pivot; and a recessed divot located in the first clamping end of the first elongate member and extended from the first hinge extension, the recessed divot configured to hold surplus fabric during the sewing operation; wherein the first clamping end has a flat surface from a first tip to the recessed divot;

a second substantially rigid, elongate member having:

a second handling end; a second clamping end having a tapering width, the second clamping end adapted to slide in a direction away from the stitching point; and a second hinge extension located between the second clamping end and the second handling end such that the second hinge extension is a fulcrum about which the second clamping end and the second handling end can pivot; a pin member coupling the first hinge extension and the second hinge extension; and a spring member having a plurality of annular coils mounted around the pin member, the spring member biasing the first elongate member and the second elongate member so as to secure between the first clamping end and the second clamping end a fabric in an overlapping relationship for the sewing operation.

2. The apparatus of claim 1, wherein a location of the first hinge extension is asymmetrical along a first longitudinal axis of the first elongate member.

3. The apparatus of claim 2, wherein the first elongate member and the second elongate member are identical pieces.

4. The apparatus of claim 1, wherein a surface of the first clamping end is substantially smooth such that the fabric is not damaged when secured between the first and the second clamping ends.

5. The apparatus of claim 1, wherein the first clamping end is adapted to resist slippage in the fabric.

6. The apparatus of claim 1, wherein a first surface area of the first clamping end is adapted to hold the fabric in place for the sewing operation.

7. The apparatus of claim 1, wherein the first handling end is ergonomically adapted to fit a finger.

8. An apparatus for a sewing operation comprising: two substantially rigid members, each rigid member with an oval surface having: a first surface with a clamping end and a handling end, the clamping end having a tapering width and adapted to slide in a direction away from a stitching point when a presser foot comes in contact with any surface of the apparatus and the clamping end having a length shorter than a length of the handling end; and a hinge extension coupled to the first surface and located between the clamping end and the handling end of the rigid member such that the clamping end and the handling end can pivot about the hinge extension; wherein the first surface of at least one of the rigid members has a recessed divot extended from the hinge extension and located in the clamping end to hold surplus fabric during the sewing operation, and the first surface is contoured at the handling end;

wherein the first surface has a flat portion from a tip of the clamping end to the recessed divot; and an elastic assembly coupling the hinge extension of each rigid member and biasing the two rigid members so as to secure between the clamping ends a fabric in an overlapping relationship.

9. The apparatus of claim 8, wherein the rigid members are identical.

10. The apparatus of claim 8, wherein a location of the at least one hinge extension is asymmetrical along a longitudinal axis of the rigid member.

11. The apparatus of claim 8, wherein the surface is substantially smooth such that the fabric is not damaged when secured between the clamping ends of each rigid member.

12. The apparatus of claim 8, wherein the clamping end is adapted to resist slippage of the fabric.

13. The apparatus of claim 8, wherein a surface area of the clamping end is adapted to hold the fabric in place for the sewing operation.

14. The apparatus of claim 8, further comprising the rigid member having a second surface, wherein the second surface of each elongate member is ergonomically adapted to fit a finger.

15. A method of assembling an apparatus for a sewing operation, comprising: coupling two substantially rigid members with an elastic assembly, each rigid member with an oval surface having:

a first surface with a clamping end and a handling end, the clamping end having a tapering width and adapted to slide in a direction away from a stitching point and having a length shorter than a length of the handling end; and a hinge extension coupled to the first surface and located between the clamping end and the handling end of the rigid member such that the clamping end and the handling end can pivot about the hinge extension; wherein at least one first surface of the rigid members has a recessed divot extended from the hinge extension and located in the clamping end to hold surplus fabric during a sewing operation, and the at least one first surface is contoured at the handling end;

wherein the first surface has a flat portion from a tip of the clamping end to the recess divot; and introducing the elastic assembly to couple the hinge extension of each rigid member and to bias the two rigid members so as to secure between the clamping ends of each rigid member a fabric in an overlapping relationship for the sewing operation.

* * * * *